(12) United States Patent
Masuhara et al.

(10) Patent No.: US 6,754,161 B1
(45) Date of Patent: Jun. 22, 2004

(54) MANUFACTURING METHOD FOR OPTICAL RECORDING MEDIUM AND MANUFACTURING DEVICE THEREOF

(75) Inventors: Shin Masuhara, Tokyo (JP); Yuichi Aki, Tokyo (JP); Kenji Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 647 days.

(21) Appl. No.: 09/626,283

(22) Filed: Jul. 25, 2000

(30) Foreign Application Priority Data

Aug. 3, 1999 (JP) .......................................... P11-219416

(51) Int. Cl.[7] ............................................... G11B 7/00
(52) U.S. Cl. ............................. 369/112.01; 369/112.23
(58) Field of Search ........................ 369/44.23, 44.32, 369/44.11, 53.31, 53.35, 44.26, 44.39, 112.01, 112.02, 112.23, 112.24, 112.27, 112.26

(56) References Cited

U.S. PATENT DOCUMENTS

| | | | | |
|---|---|---|---|---|
| 5,113,385 A | | 5/1992 | Osawa | |
| 5,157,555 A | * | 10/1992 | Reno | 369/44.11 |
| 5,191,624 A | * | 3/1993 | Ito et al. | 369/44.11 |
| 5,633,852 A | | 5/1997 | Maruyama et al. | |
| 5,657,171 A | | 8/1997 | Maruyama et al. | |
| 5,742,567 A | | 4/1998 | Ikeya | |
| 6,418,108 B1 | * | 7/2002 | Ueda et al. | 369/112.23 |
| 6,442,110 B1 | * | 8/2002 | Yamamoto et al. | 369/44.23 |

OTHER PUBLICATIONS

Patent Abstracts of Japan, JP 09-318873, Dec. 12, 1997.
Patent Abstracts of Japan, JP 09-288824, Nov. 4, 1997.

* cited by examiner

Primary Examiner—Thang V. Tran
(74) Attorney, Agent, or Firm—Oblon, Spivak, McClelland, Maier & Neustadt, P.C.

(57) ABSTRACT

This invention relates to a manufacturing method for an optical information recording medium and a manufacturing device for an optical information recording medium, and is applicable for instance to devices for optical disks, capable of focusing a laser beam from an exposure semiconductor laser at high density onto a base disk. This invention compensates the chromatic aberrations of the objective lens with a chromatic aberration optical system or compensates for fluctuations in the wavelength by regulating the temperature of the semiconductor laser.

3 Claims, 11 Drawing Sheets

FIG. 5

| LATTICE SPACING P=500[nm] | | |
|---|---|---|
| WAVELENGTH $\lambda$ [nm] | DIFFRACTION ANGLE $\theta$ [rad] | DIFFRACTION ANGLE $\theta$ [deg] |
| $\lambda$ =399 | 0.92397 | 52.93955 |
| 400 | 0.92730 | 53.13012 |
| 401 | 0.93064 | 53.32153 |

FIG. 6

| LATTICE SPACING P=1000[nm] | | |
|---|---|---|
| WAVELENGTH $\lambda$ [nm] | DIFFRACTION ANGLE $\theta$ [rad] | DIFFRACTION ANGLE $\theta$ [deg] |
| $\lambda$ =399 | 0.41043 | 23.51568 |
| 400 | 0.41152 | 23.57818 |
| 401 | 0.41261 | 23.64071 |

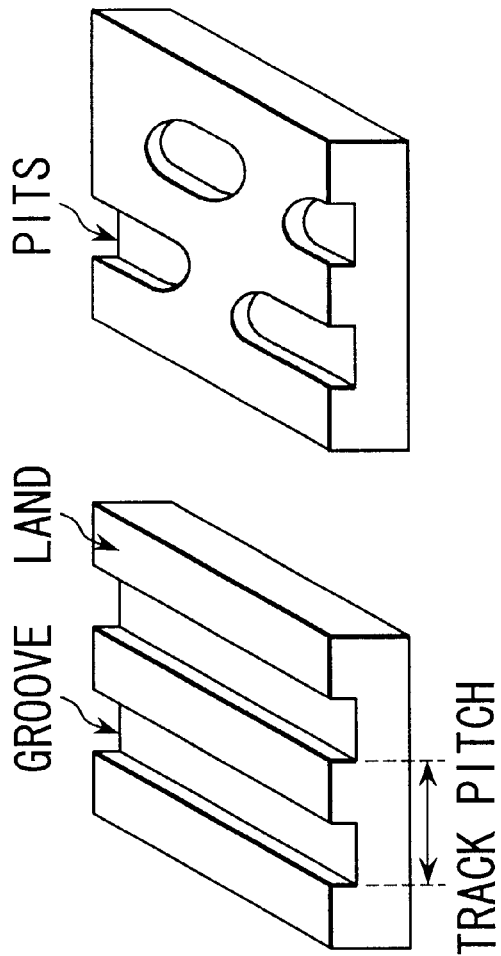

MANUFACTURING METHOD FOR OPTICAL RECORDING MEDIUM AND MANUFACTURING DEVICE THEREOF

BACKGROUND OF THE INVENTION

1. Field of the Invention

This invention relates to a manufacturing method for an optical information recording medium and a manufacturing device for an optical information recording medium, and is for instance applicable to light exposure devices for base disks. The present invention regulates the temperature of the semiconductor laser by compensating for chromatic aberrations or compensating for fluctuations in the wavelength so that with a laser beam from a laser-pumped semiconductor laser, a base disk can be exposed at high precision.

2. Description of the Related Art

In the process of the related art for manufacturing a base disk, after exposing the disk in the exposure device, an optical disk is manufactured by a stamper. The stamper further produces the base disk in mass quantities and an optical disk is produced after forming a protective film on the base disk.

A perspective view of the optical disk is shown in FIG. 8. After an information recording surface 3 is formed on the base disk 2, a protective film 4 is formed to produce an optical disk 1.

The base disk 2 is disk-shaped member of transparent plastic. Tiny irregularities (convex and concave shapes) are formed on the information recording surface side of this base disk 2. These tiny irregularities are set as various shapes according to the manufacture of the optical disk. In an optical disk for record and reproduction such as the initial minidisk, groove shapes are formed by a laser beam to constitute the guide grooves shown by arrow A in the enlarged view in FIG. 8. In an optical disk solely for reproduction such as a compact disc, concave shapes are formed to constitute the pits shown by arrow B in the enlarged view of FIG. 8. In initial MO (magnetic optical) disks made to ISO standards, both pits and grooves are formed.

Among the optical disks 1 capable of recording/reproducing, phase-change optical disks have an information recording surface formed of laminations of phase-change layers and reflective layers on the surface of the base disk 2 formed with these tiny irregularities. On optical magnetic disks, the information recording surface is formed of laminations of magnetic layers and reflective layers. On an optical disk 1 solely for reproduction (playback), an information recording surface is formed of a reflective layer on the surface of the disk substrate 2.

A diagrammatic sketch of the manufacturing process for the optical disk for producing the disk substrate 2 is shown in FIGS. 9A to 9F. In the manufacturing process for this optical disk, the surface of a glass substrate 5 is ground (polished) flat, the glass substrate 5 washed (FIG. 9A), and a photoresist 6 applied by spin coating (FIG. 9B) to the surface of the glass substrate 5. The photoresist 6 here is applied in a thickness of approximately 100 nm, using a material that is alkali-soluble when exposed to light. The manufacturing method for the optical disk in this way produces a base disk 7 from this glass substrate 5.

Next, in the optical disk manufacturing process, the disk base 7 is set in the exposure device and the disk base 7 driven to rotate at a specific speed (FIG. 9C). While in this state, a laser beam L1 as the exposure light, is focused by means of an objective lens 6 on the photoresist 6 on the disk base 7, and along with modulating the exposure laser beam L1 by means of a modulating signal, the beam position of the exposure laser beam L1 is shifted sequentially to the outer circumference. The scanning track of the exposure laser beam L1 is in this way formed in a spiral shape in the optical disk manufacturing process, and a latent image formed according to the modulation signal in this scanning track.

The latent image formed on the base disk 7 in this way in the optical disk manufacturing process is developed (FIG. 9D) and the portions of the photoresist 6 exposed to light are dissolved away by the developer fluid. In this way, the tiny irregularities are formed on the surface of the base disk 7. The example in FIG. 9D shows that the base disk 7 is formed with the tiny irregularities corresponding to the grooves and lands.

In the next step (FIG. 9E) of the process for manufacturing the optical disk, after a nickel plating layer 8 is formed by nickel (Ni) plating on the side formed with the tiny irregularities, this nickel plating layer 8 is then peeled away from the base disk 7. In this way, in the optical disk manufacturing process, the tiny irregularities of the base disk 7 are transferred to the nickel plating layer, and a frame made by the nickel plating layer 8 then set in a metal mold to make a stamper 9.

Next, in the process for manufacturing the optical disk, the disk substrate 2 is made by the plastic injection molding or the so-called 2P method (photo polymerization) using the stamper 9 (FIG. 9F). The tiny irregularities of the base disk 7 transferred to the stamper 9 are now transferred to the disk substrate 2. The latent image of the tiny irregularities described using FIG. 8 is in this way formed on this disk substrate 2 by exposure of the base disk 7 to light in the exposure device.

A flat view showing the exposure device used in light exposure of the base disk 7 is shown in FIG. 10. A diagrammatic sketch for describing the optical system of an exposure device 11 is shown in FIG. 11. The exposure device 11 contains a base disk 7 on a turntable 12, driven to rotate in a specific direction shown by the arrow A. The exposure device 11 drives an optical drive table 13 radially across the base disk 7 as shown by the arrow B. In this way, the exposure device 11 makes an exposure laser beam (LR) scanning track in a spiral shape on the base disk 7 by means of the optical system contained in the optical drive table 13, and makes a latent image consisting of arrays of pits in the scanning track.

A laser light source 14 in the exposure device 11 is a gas laser comprising Ar, Kr, He—Cd, etc. An (exposure) laser beam LR is beamed within a wavelength of 500 nm and quantity of light of 50 mW to expose the photoresist on the base disk 7 to light. When the laser light source 14 is for a Kr laser, the (exposure) laser beam LR is beamed at a wavelength within 413 nm.

An electro-optical crystal element 15 and an optical detector element 16 compensate (offset) fluctuations of the luminous energy in the (exposure) laser beam LR and emit the beam. In other words, the electro-optical crystal element 15 changes the polarized plane of the (exposure) laser beam LR emitted by the laser light source 14 according to a drive signal and the optical detector element 16 selectively permeates the specified polarized surface components. Next, a beam splitter 17 separates the (exposure) laser beam LR into two beams and outputs these beams and the optical receive element 18 receives the (exposure) laser beam LR on the side permeated by the beam splitter 17 and outputs the detected quantity of light (luminous energy).

A recording optical power control circuit 19 (FIG. 11) generates a drive signal so that the signal level with the light quantity detection results from the optical receive element 18 match a reference voltage REF and drives the electro-optical crystal element 15. The electro-optical crystal element 15 thus forms a feedback loop along with the optical detector element 16, the beam splitter 17, the optical receive element 18, and the optical receive element 18 and maintain the luminous energy (hereafter, quantity of light) of the (exposure) laser beam LR at a fixed luminous energy level.

The electro-optical crystal element 15 along with a feedback loop having a frequency response with an upper limit of 1 [MHz], reduces the noise of the (exposure) laser beam LR.

A lens 21 (FIG. 10) converts the side of the exposure laser beam LR reflected by the beam splitter 17 into a concentrated light beam and outputs it to an AOM (acousto-optic modulator) 22. The AOM22 is driven by a record signal corresponding to the latent image formed on the base disk 7, and performs on/off modulation of this (exposure) laser beam LR. Next, a lens 23 converts the light emitted from the AOM22 into parallel light rays.

Next, the polarized beam splitter 24 bends the optical path of the (exposure) laser beam LR emitted from the lens 23 and emits the beam. The ¼ wave plate 25 applies a phase change to the (exposure) laser beam LR and emit a circular polarized light.

A beam expander 28 comprises a lens 26 and a lens 27 and expands the diameter of the (exposure) laser beam LR beamed from the ¼ wave plate 25 and emits the beam. When the focus distance of the lens 26 and lens 27 are respectively set as f1 and f2, the beam expander 28 expands the beam diameter of the (exposure) laser beam LR by f2/f1.

An objective lens 30 receives the (exposure) laser beam LR by way of a dichroic prism 29 and a mirror not shown in the drawing, and focuses the (exposure) laser beam LR on the resist layer of the base disk 7. The optical system with components from the beam expander 28 to the objective lens 30, along with the focus control optical system described later on, are installed in the optical drive table 13 of the exposure device 11. In the exposure device 11, the movement of the optical drive table 13 shifts the light exposure position so that a latent image of pit arrays are formed on the base disk 7.

When the (exposure) laser beam LR is beamed in this way in the exposure device 11, a returning light is acquired from the base disk 7. This returning light follows the reverse of the (exposure) laser beam LR optical path and is linearly polarized by the ¼ wave plate 25. The returning light consequently permeates a beam splitter 24. A mirror 31 bends the optical path of the returning light permeating through the beam splitter 24, and a lens 32 then guides the returning light into an image device 33. The image device 33 receives the returning light and outputs the received light results. The exposure device 11 can in this way monitor the beam shape of the exposure laser beam on the base disk 7 and is capable of adjusting control items such as focus control.

The focus control of the optical system on the other hand, detects the distance to the base disk 7 by means of the so-called isolated axis method. In other words, the focus control of the optical system is installed in the optical drive table 13 and beams out a focus control laser beam LF by means of the laser light source 35.

A polarized beam splitter 36 reflects the laser beam LF. Next, a ¼ wave plate 37 applies a phase change to this laser beam LF and emits a circular polarized light. A dichroic prism 31 reflects the laser beam LF beamed from the ¼ wave plate 37 to combine and emit it with the (exposure) laser beam LR constituting a permeable light.

The focus control optical system is set in this way to separate the optical axis of laser beam LF combined with laser beam LR, from the optical axis of the objective lens 30 by a specific distance. The laser beam LF is in this way, beamed diagonally onto the base disk 7 and, the optical axis of the reflected light from laser beam LF undergo a regular (specular) reflection on the base disk 7, and are separated from the objective lens 30 optical path according to the distance between the base disk 7 and the objective lens 30.

A dichroic prism 31 reflects the reflected light obtained in this way from the base disk 7 and emits the beam onto the ¼ wave plate 37. By applying a phase differential to this reflected light, the ¼ wave plate 37 emits a reflected light from the polarized plane intersecting with the input light of the laser beam LF.

The reflected light next permeates the polarized beam splitter 36 and the position detector element 39 receives this reflected light and outputs a position detection signal according to the change in signal level relative to the position of the received light. The exposure device 11 shifts the objective lens 30 in the direction of the optical axis so that the position detection signal reaches a specified level. Focus control is thus performed so that a latent image can be stably formed by pit arrays.

However the exposure device of the related art has the problem that the laser light source is a gas laser so that large size equipment is unavoidable. The number of exposure devices 11 that can be installed at the manufacturing site is therefore limited by the available installation space so that the optical disks cannot be produced in sufficient quantities. The laser light source of the gas laser incidentally, has approximate dimensions of a length of 1.2 m, a weight of 40 kg, and the exposure device has approximate dimensions of a width of 1.5 to 2.0 m, a depth of 1.0 to 1.2 m, a height of 1 m and a weight of 2 t.

Further problems are that the optical system has a complicated structure, which causes a large equipment size. Time is also required to adjust the optical system.

The optical path of the exposure laser beam LR becomes longer because of the complex structure of the optical system, rendering unavoidable effects from shimmer or turbulence in the air along the optical path so that the accuracy of the light exposure precision tends to deteriorate.

The gas laser further requires liquid cooling. The vibration from the flow path for the cooling fluid is conveyed to sections such as the optical drive table 13 which also adversely affects the accuracy of light exposure precision.

Use of a semiconductor laser was considered in order to resolve all these problems with the related art. More specifically, using a semiconductor laser allows the laser light source to be made more compact, and the overall shape of the light exposure device can be made compact. Further, the output beam from the laser light source can be directly modulated, so that the optical modulating element (lens 21 and 23 in FIG. 10 and AOM 22, 23) can be eliminated and the optical system given a simpler structure. The overall shape of the light exposure device can therefore be reduced and further the task of adjusting the optical system can be simplified. Simplifying the structure of the optical system makes the length of the optical path shorter by a corresponding amount so that a decline in exposure precision due to shimmer or turbulence in the air around the optical path can also be avoided. A yet further advantage is that that cooling fluid is not required so that a decline in exposure precision due to vibration conveyed from the fluid path can be prevented.

During actual use however, secondary modes are present in the semiconductor laser so that the coherence is poor compared to a gas laser and the laser beam tends to spread out plus or minus several nm versus the center wavelength.

In a laser beam having this kind of spreading, the focus position at each wavelength differs when focusing with an objective lens in a phenomenon where chromatic aberrations occurs, and consequently, a small diameter beam spot cannot be made to occur even by focusing the light up to the refraction index of the laser beam. Chromatic aberrations differ according to the wavelength for the refraction rate of the glass or plastic lens material however, generally the shorter the wavelength, the larger the chromatic aberration.

The material of the objective lens contains a low dispersion glass material such as FCD-1, FCD-10, 434–950. Even with this low dispersion glass however, at an infrared light on a wavelength of 800 nm, the focus point will deviate approximately 70 nm when using an objective lens in the light exposure device of the related art, for every one nanometer that the wavelength differs. Therefore in an exposure laser beam with a wavelength in the vicinity of 400 nm, the amount of deviation becomes even larger.

In the light exposure device 11 on the other hand, an objective lens with a high number of apertures (N.A.) is used of about 0.9. In such a lens with a high number of apertures the depth of the focus point is exceedingly shallow. The focus point depth in other words, is shown by $\pm\lambda/(2\times(NA)^2)$ and when the number of apertures (N.A.) is 0.9, an (exposure) laser beam LR oh a wavelength of approximately 400 nm has a focus depth of ±250 nm.

In contrast, in an optical disk with a recording density for example approximately that of a DVD, the defocus amount allowed by defocus control during exposure is experientially known to be approximately one-third of the focus point depth. When the amount of defocus exceeds this figure, the signal waveform of the recording signal drastically deteriorates. Thus, even if the spread at the wavelength of an exposure laser beam is assumed to be approximately ±1 nm, then deterioration of the reproduction signal is likely to occur. Therefore, deterioration in the signal wave form of the reproduction signal is unavoidable when the semiconductor laser comprises the laser light source.

The semiconductor laser further has the disadvantage that the center wavelength fluctuates with changes in temperature. This fluctuation in the center wavelength varies according to the semiconductor material including the semiconductor laser but in for instance an AlGaAs type semiconductor laser with a center wavelength of approximately 835 nm, the center wavelength will change approximately ±5 nm for package temperature fluctuations of ±20° C.

In the light exposure device 11, when the center wavelength of an (exposure) laser beam of this type fluctuates, the (exposure) laser beam defocuses by a corresponding amount on the base disk, the diameter of the beam spot formed on the base disk spreads out, and achieving light exposure with high precision becomes difficult.

Also, by changing the phase differential applied such as with a ¼ wave plate, the quantity of light (luminous energy) of the permeable light, and reflected light is changed on optical elements having a light detection plane such as a polarized beam splitter, and consequently, the light quantity of the exposure laser beam focused on the base disk is changed. Incidentally, when exposing a DVD pattern to light with an (exposure) laser beam on a wavelength of 413 nm and an optical system with a number of apertures (N.A.) of 0.90, the fluctuations in light quantity of the exposure laser beam must be held within 5 (%P—P), however according to the conditions of the optical system, a light quantity of this amount will fluctuate just by a change of several nm in the wavelength.

Achieving high light exposure accuracy is therefore difficult when the laser light source is a semiconductor laser. Even if a latent image is formed with the desired, specified high precision, recording at a maximum short bit length of 0.40 nm, and a track pitch of 0.74 nm as used in DVD recording is impossible.

SUMMARY OF THE INVENTION

In view of the above problems with the related art, this invention has the object of providing a manufacturing method for an optical information recording medium and a manufacturing device for an optical information recording medium capable of exposing a base disk to light at high precision with a laser light source comprised by a semiconductor laser.

To resolve the above problems with the related art, a manufacturing method for an optical information recording medium or a manufacturing device for an optical information recording medium of this invention includes a chromatic aberration compensation optical system to compensate for chromatic aberrations in the objective lens for at least the (exposure) laser beam.

To further resolve the problems of the related art, in a manufacturing method for an optical information recording medium or a manufacturing device for an optical information recording medium according to one aspect of the present invention, a laser-pumped semiconductor laser emits a laser beam for light exposure, wherein temperature variations in the vicinity of the laser light source are maintained within ±1° C. by a specified temperature regulator mechanism when the wavelength of the laser beam for light exposure is less than 500 nm.

To also resolve the problems of the related art, a manufacturing method for an optical information recording medium or a manufacturing device for an optical information recording medium according to another aspect of the present invention, is provided wherein the temperature of the semiconductor laser is controlled so the wavelength of the exposure laser beam is a fixed wavelength.

To yet further resolve problems of the related art, a manufacturing method for an optical information recording medium or a manufacturing device for an optical information recording medium according to another aspect of the present invention is provided, wherein the optical system from the semiconductor laser to the objective lens is a sealed space.

To also resolve the problems of the related art, a manufacturing method for an optical information recording medium or a manufacturing device for an optical information recording medium of according to another aspect of the present invention is provided, wherein the optical system from the semiconductor laser to the beaming of the exposure laser beam onto the objective lens is maintained as one integrated piece by a holding member of an integrated exposure optical system.

To further resolve the problems of the related art, a manufacturing device for an optical information recording medium of according to another aspect of the present invention is provided with a holding member of an exposure optical system for holding the semiconductor laser, automatic light quantity regulator means and optical system in one integrated, replaceable piece.

To still further resolve the problems of the related art, a manufacturing device for an optical information recording medium according to another aspect of the present invention is provided with an imaging means to capture an image of the returning light isolated by the light isolator means and output the imaging results and, a light quantity detection means to receive the light returning from the light isolator means and output the light quantity detection results.

According to another aspect of the present invention, by installing a chromatic aberration compensation optical system to compensate for the chromatic aberration of at least the objective lens for the exposure laser beam, the occurrence of chromatic aberrations can be prevented even in exposure laser beams with a widened wavelength, a tiny beam spot formed, and a sufficient margin for defocusing can be obtained.

According to another aspect of the present invention, a laser-pumped semiconductor laser emits a laser beam for light exposure, and when the wavelength of the exposure laser beam for light exposure is less than 500 nm, temperature variations in the vicinity of the laser light source are maintained within plus or minus one degree by a specified temperature regulator mechanism so that changes in the wavelength of the exposure laser beam can be sufficiently reduced.

Also, according to another aspect of the present invention, by controlling the temperature of the semiconductor laser so that the wavelength of the exposure laser beam becomes a fixed wavelength, a decrease in light exposure precision due to fluctuations in the wavelength can be prevented.

Further, according to another aspect of the present invention, by installing the optical system from the semiconductor laser to the objective lens in a sealed space, disturbances and turbulence from the inflow of outside air can be prevented and a drop in light exposure precision can be prevented.

Still further, according to another aspect of the present invention, by maintaining the optical system from the semiconductor laser to the beaming of the exposure laser beam onto the objective lens in a holding member of one light exposure optical system, the task of adjusting the optical system can be simplified and the assembly task simplified by a corresponding amount so that maintenance and servicing is significantly improved.

Yet further, according to another aspect of the present invention, by comprising a holding member of an exposure optical system for holding the semiconductor laser, the automatic light quantity regulator means and the optical system in one integrated, replaceable piece, the task of adjusting these mechanisms can be simplified, the assembly task simplified by a corresponding amount, and the maintenance and servicing significantly improved.

Even further, according to another aspect of the present invention, by comprising an imaging means to capture an image of the returning light isolated by the light isolator means and output the imaging results and, a light quantity detection means to receive the light returning from the light isolator means and output the light quantity detection results, convenience is provided since exposure is performed while monitoring the current status, and the task of adjusting the optical system can be further simplified.

BRIEF EXPLANATION OF THE DRAWINGS

FIG. 5 is a table showing the diffraction angles when the repetitive pitch of the diffraction grating is set at 500 nm.

FIG. 6 is a table showing the diffraction angles when the repetitive pitch of the diffraction grating is set at 1000 nm.

FIGS. 8A to 8C are diagrammatic sketches showing the optical disk.

DESCRIPTION OF THE PREFERRED EMBODIMENTS

The embodiments of the invention are next described in detail while referring to the accompanying work drawings.

(1) Structure of the Embodiment

Figure 2:
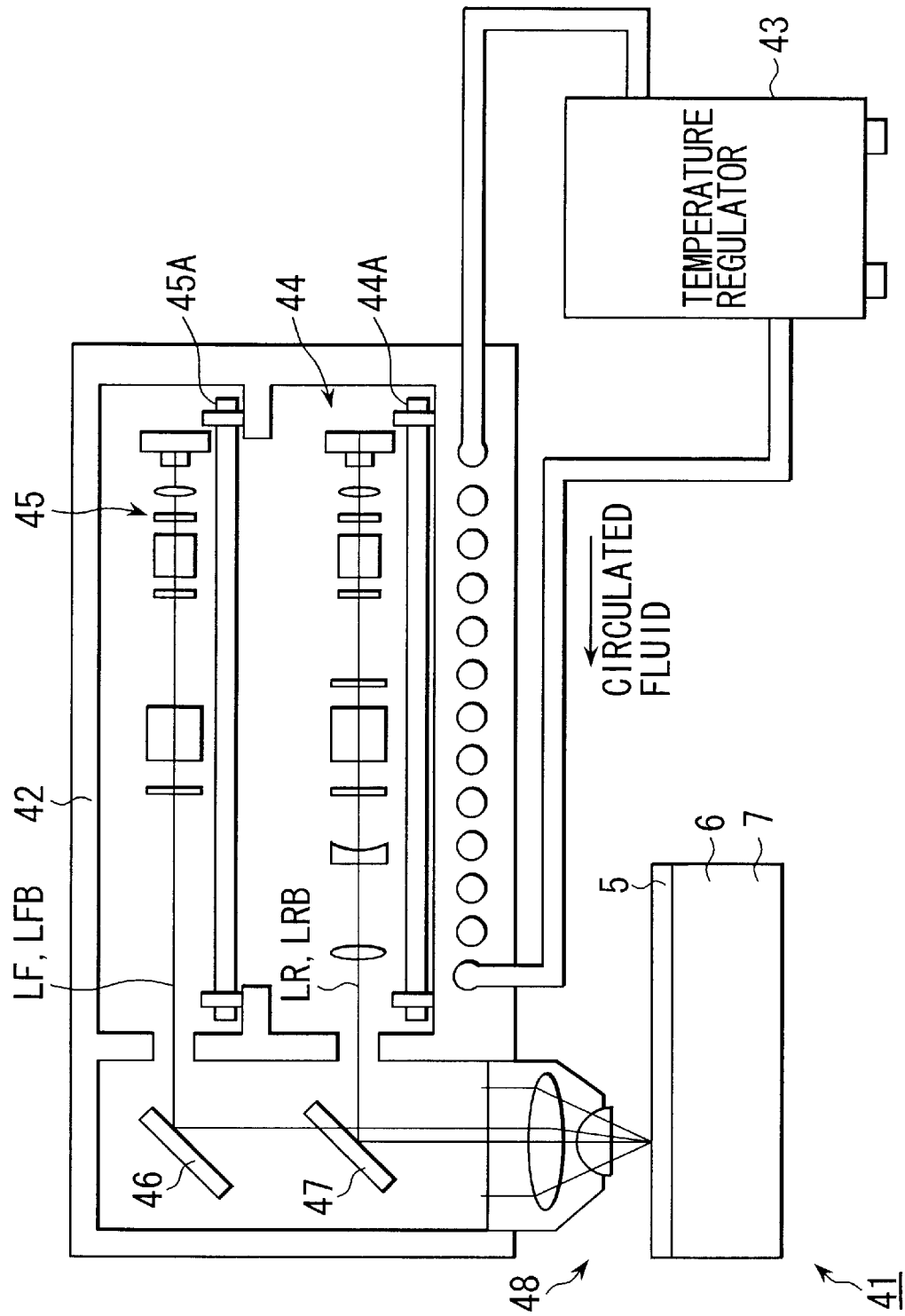
FIG. 2 is a cross sectional view showing the optical drive table of the light exposure device of FIG. 1.

A cross sectional view of structure of the optical system of the light exposure device of this invention is shown in FIG. 2. In the light exposure device in this embodiment, the drive circuit related to the entire optical system is stored as one unit in an optical drive table 42. The light exposure device 41 can therefore synchronize the optical drive table 42 with the rotation of the base disk 7, and move the optical drive table 42 sequentially to the outer circumference of the base disk 7, the scanning track of the exposure laser beam can form spiral shapes on the base disk 7, and pit arrays in the scanning track form a latent image.

The optical drive table 42 is formed in a box shape, and the optical system and related drive circuit are stored in the inner space. The optical drive table 42 is made so that the inner space is sealed, so the optical system can be protected from disturbance or turbulence from intrusion of outside air.

A pipe is installed at the bottom of the optical drive table 42. A temperature-regulated fluid from a temperature regulator 43 is circulated through this pipe. The optical drive table 42 is therefore temperature regulated so that variations in the internal temperature constituting the temperature in the vicinity of the laser light source are maintained with plus or minus degree.

The optical drive table 42 is also formed with a dual layer structure. An optical system 44 for the exposure laser beam is installed in the lower layer space on the base disk 7 side, and a focus control optical system 45 is installed in the space on the upper side.

The optical system 44 of the exposure laser beam comprises related drive circuits, and an optical system from the laser light source to emit a laser beam LR onto the objective lens and emit a laser beam. Optical components such as the laser light source, and the related drive circuits are installed on one holding member 44A constituted by a flat member. This holding member 44A is installed on the optical drive table 42 in a state while loaded with these optical components and related drive circuits and is capable of easy replacement. This design and easy replacement feature were provided to simplify maintenance tasks and servicing, etc.

Figure 11:
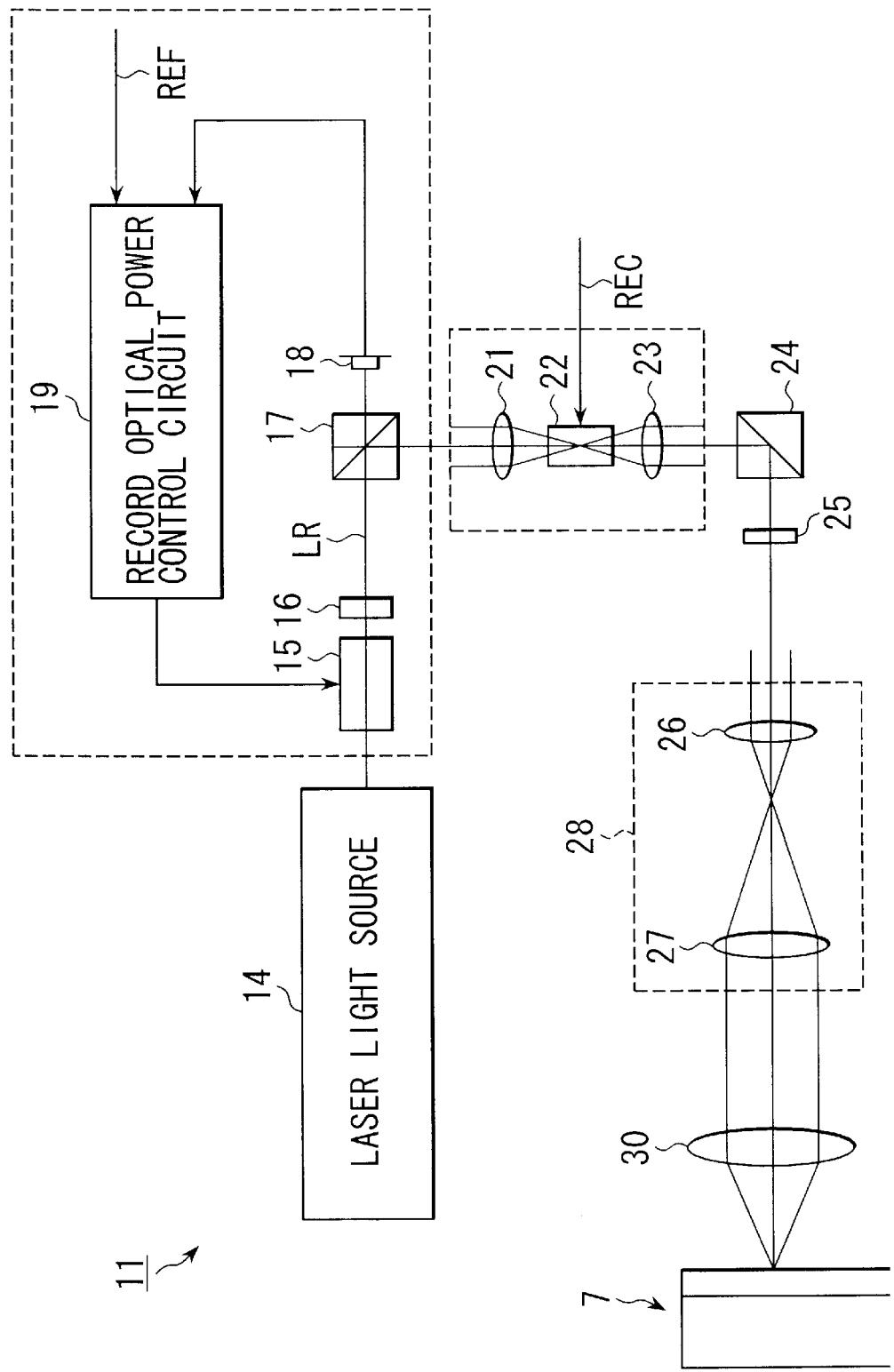
FIG. 11 is a diagrammatic sketch showing the optical system of the light exposure device of FIG. 10.

A focus control optical system 45 is an optical system for detecting the distance to the base disk 7 by the isolated axis detection method described in FIG. 11. The focus control optical system 45 comprises an optical system to output a laser beam LF for focus control, an optical system to receive the returning light LF from the base disk 7, and related drive circuits all installed on one holding member 45A constituted by a flat member. This holding member 45A is installed on the optical drive table 42 in a state while loaded with these optical components and related drive circuits and is capable of easy replacement. This design and easy replacement feature were provided to simplify maintenance tasks and servicing, etc.

The optical drive table 42 uses a total reflection mirror 46 to reflect the laser beam emitted from the focus control optical system 45, towards the base disk 7 and then the dichroic mirror 47 combines it with the exposure laser beam LR and guides it into an objective lens 48. The objective lens 48 is a lens comprised of a high number of apertures (N.A.). The objective lens 48 focuses the exposure laser beam LR and the laser beam LF emitted from the dichroic mirror 47, onto the base disk 7. In this embodiment, the objective lens 48 focuses the exposure laser beam LR input as largely parallel light rays and comprises an infinite optical system.

In this way, in the optical drive table 42, the returning light LRB of the exposure laser beam LR, and the returning light LFB of the laser beam LF respectively travel the optical paths of the exposure laser beam LR and laser beam LF in reverse, and are respectively processed in the optical system 44 of the exposure laser beam and the focus control optical system 45.

Figure 1:
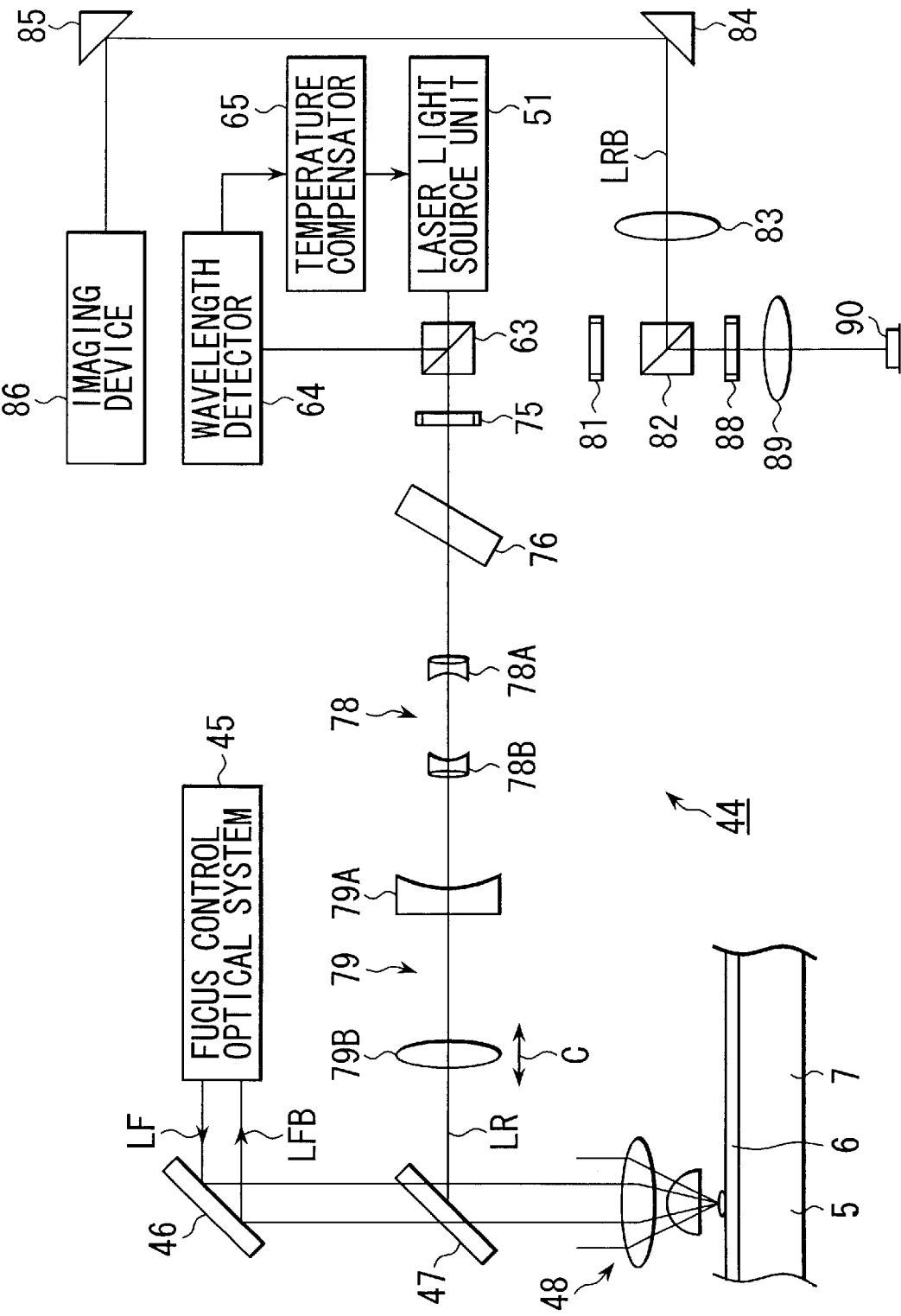
FIG. 1 is a diagrammatic sketch showing the optical system for the light exposure device of the embodiment of this invention.

A diagrammatic sketch of the exposure laser beam optical system 44 along with the peripheral structure is shown in FIG. 1. In the exposure laser beam optical system 44, the exposure laser beam LR is emitted from the laser light source 51.

Figure 3:
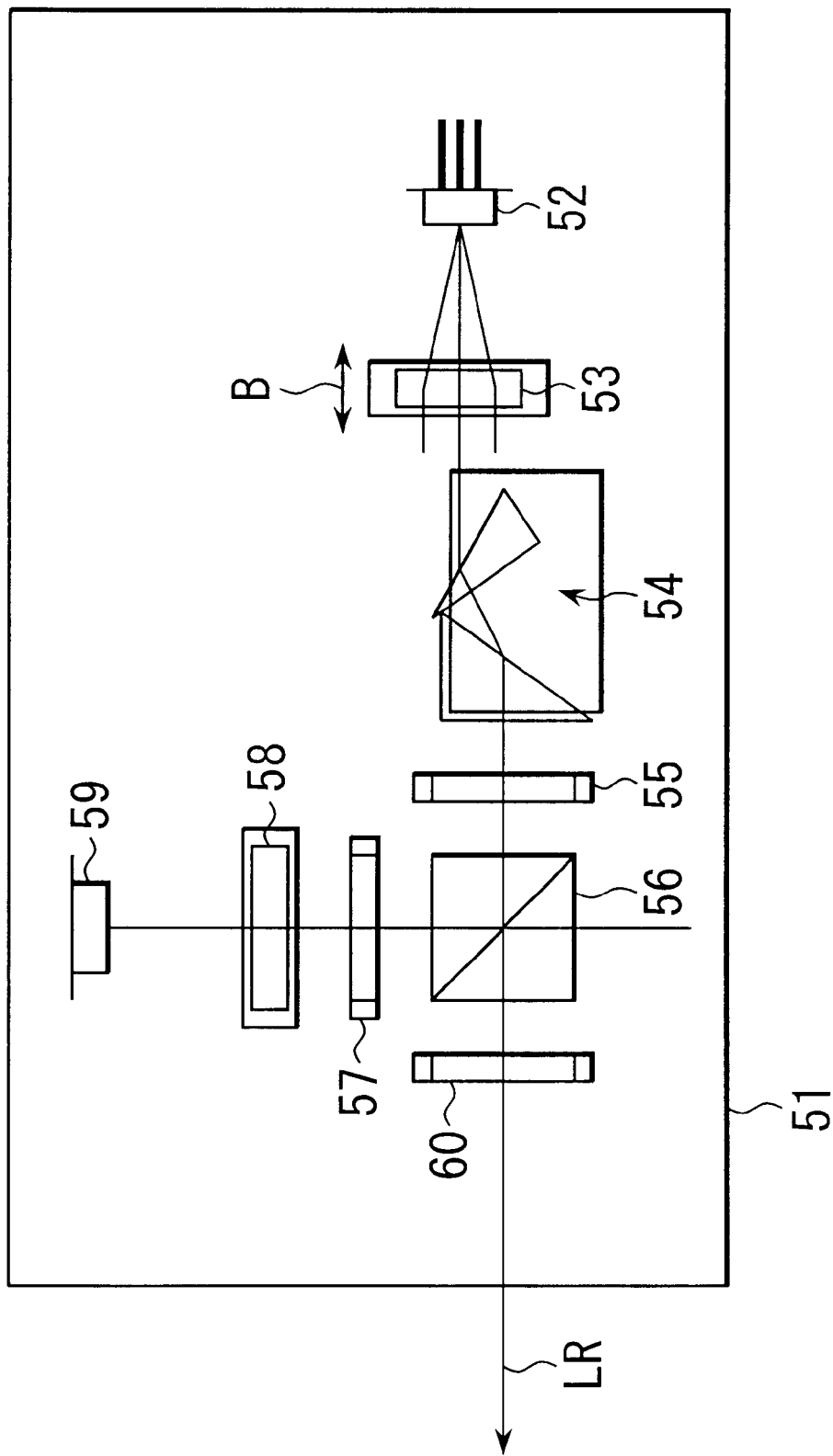
FIG. 3 is a diagrammatic sketch showing the laser light source unit of the optical system of FIG. 1.

A laser light source 51 as shown in FIG. 3, comprises a laser light source to emit an exposure laser beam LR, a mechanism to form the beam shape of the exposure laser beam LR, an automatic light quantity regulating device, and related drive circuits on one flat-plate shaped optical circuit board. The laser light source 51 therefore allows easily performing tasks such as replacing the laser light source, since an already adjusted laser light source can be easily installed as a substitute. Therefore, adjustment tasks are easily performed since tasks such as positioning of the optical components comprising the laser light source 51 can be eliminated.

The optical circuit board of the laser light source 51 is replaceable and further, a tilt adjuster device to achieve a specific tilt is installed on the optical drive table 42 so that the inclination for each optical circuit board can be adjusted.

The semiconductor laser 52 in the laser light source 51 comprises a laser light source to emit an exposure laser beam LR on a wavelength of approximately 400 nm. The laser light source 51 therefore has a more compact laser light source compared to when a gas laser is used, and the overall dimensions can be reduced by a corresponding amount. Also, the amount of heat emitted can be reduced compared to when a gas laser is used so that the amount of circulating fluid can be reduced by a corresponding amount, so that vibration from the circulation of fluids is also reduced a relative amount.

The semiconductor laser 52 is driven by the drive circuits on this optical circuit board and emits an exposure laser beam. This drive circuit drives the semiconductor laser 52 by means of a specific drive signal. Thus, along with drive circuit operation, the exposure laser beam LR is thus modulated and emitted. The modulator element required when using a gas laser is therefore eliminated in the laser light source 51, so the optical system can therefore be simplified by a corresponding amount and the overall dimensions can also be reduced. The optical path is also shorter so a drop in exposure accuracy due to turbulence or shimmer can be prevented.

During direct modulation of the exposure laser beam LR, the drive circuit drives the semiconductor laser 52 so as to maintain the light quantity of the exposure laser beam at a fixed value. The laser light source 51 therefore does not require an optical element for compensating the light quantity on the optical path of the exposure laser beam LR and is configured to comprise an automatic light quantity regulator. Thus, the optical system can in this way be simplified by a corresponding amount since the optical element is eliminated and the overall dimensions can also be reduced. The optical path is also shortened so a drop in exposure accuracy due to turbulence or shimmer can be prevented.

A collimator lens 53 is installed as shown by the arrow B to allow fine adjustments of the installation position along the direction of the optical axis of the exposure laser beam LR. The exposure laser beam LR can therefore be converted into parallel light rays and emitted.

An anamorphic prism 54 corrects and emits the beam shape of the exposure laser beam LR into a circular shape. In other words, the exposure laser beam LR emitted by the semiconductor laser 52 is taken from a divergent angle of 10 degrees versus a direction parallel to the activated layer and emitted at a divergent angle of 30 degrees perpendicular to the activated layer and the beam shape changed and emitted in this way as an elliptical shape. The anamorphic prism 54 comprises a combination of two prisms and by enlarging the diameter of the beam on the shorter axis of the ellipse, corrects the beam with this elliptical shape into a circular shape and emits the beam. When the light quantity of the exposure beam LR is sufficiently large, the anamorphic prism 54 is further capable of sufficiently blocking the exposure laser beam LR at the input beam aperture position of the objective lens 48 and when a function identical to beam shaping is achieved, then the above-described function may be omitted.

A ½ wave plate 55 rotatable and adjustable within the vertical plane on the optical axis of exposure laser beam LR, is installed on the optical path of the exposure laser beam LR to allow setting a specific value for the light quantity ratio of the exposure laser beam LR permeating and reflecting from the subsequent polarized beam splitter 56. In other words, the subsequent polarized beam splitter 56 reflects, passes (is permeable to) and emits the exposure laser beam LR emitted from the ½ wave plate 55.

A ¼ wave plate 57, along with applying a phase differential to the light returning from the polarized beam splitter 56 and emitting the beam, also applies a phase differential to the returning light from this beam. The returning light is thus reflected by the polarized beam splitter 56 and does not return to the semiconductor laser 52.

A focus lens 58 focuses the exposure laser beam LR beamed from the ¼ wave plate 57 onto the light receiving surface of the optical receive element 59. The optical receive element 59 then outputs the results of light received from the exposure laser beam LR as the laser beam LR light quantity detection results.

In the laser light source 51, the drive circuit for the semiconductor laser 52 generates a drive signal for the semiconductor laser 52 based on these light quantity detection results, so that the peak light quantity of the exposure laser beam LR is maintained at a fixed light quantity by automatic light quantity regulation. Control of the peak light quantity is implemented by correcting the signal level of the drive signal so that the peak hold value of the detected light quantity matches a specified standard value. The light quantity the exposure laser beam LR is therefore regulated in this way by a high frequency signal, ranging according to circumstances, from several megahertz to several hundred megahertz. In the laser light source 51, the drive circuit is installed along with the semiconductor laser 52 on the optical circuit board, so that the drive circuit, the optical receive element 59, and the semiconductor laser 52 can be positioned in close mutual proximity, and regulation of the light quantity by a high frequency signal can be reliably performed.

A ¼ wave plate 60, applies a phase differential to the side of the polarized beam splitter 56 permeated by exposure laser beam LR and emits the beam, in this way a specific value is set for the light quantity ratio of the permeable light and reflected light in the polarized beam splitter 63 (FIG. 1) installed subsequent to the laser light source 51 and, the returning light of this exposure laser beam permeates the polarized beam splitter 56 and does not return to the semiconductor laser 52.

Next, the polarized beam splitter 63 (FIG. 1) splits the exposure beam emitted from the laser light source 51 into two light rays emitted respectively to a wavelength detector 64 and to the objective lens side of the optical system. Light returning in the reverse of the optical path of the exposure laser beam LR on the objective lens side of the optical system is reflected so as not to return to the laser light source 51.

The wavelength detector 64 receives the exposure laser beam LR reflected from the polarized beam splitter 63, detects that wavelength and outputs the wavelength detection results. Based on the results from the wavelength detector 64, a temperature compensator 65 regulates the temperature of the semiconductor laser 52 so that the exposure laser beam LR has a fixed wavelength.

Figure 4:
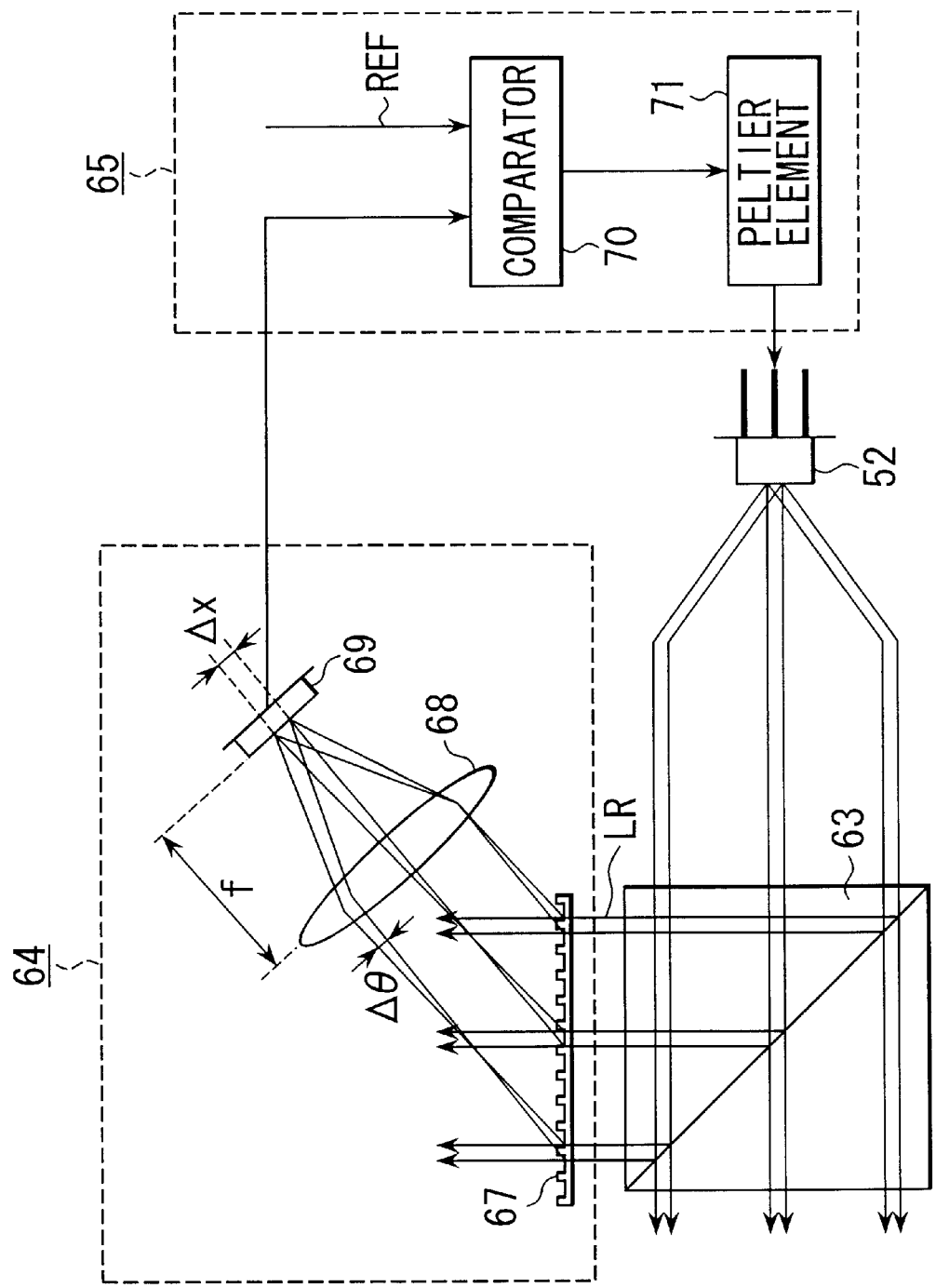
FIG. 4 is a diagrammatic sketch for describing temperature control in the optical system of FIG. 1.

A perspective diagram showing in detail the structure of the wavelength detector 64, the temperature compensator 65 and peripheral configuration is shown in FIG. 4. A diffraction grating 67 in the wavelength detector 64 diffracts the exposure laser beam LR reflected by the polarized beam splitter 63 and emits the beam. Of the diffracted light emitted from the diffraction grating 67, the condenser lens 68 condenses the primary diffraction light on the light receiving surface of a subsequent position detector element 69. The position detector element 69 outputs position detection results showing the focusing position of this diffracted light.

When the repetitive pitch P of the diffraction grating 67 is set as P, the diffraction angle θ of the primary diffraction light can be expressed as Psin θ=λ. Therefore, when the wavelength of the exposure laser beam LR fluctuates, the diffraction angle θ of the diffraction light changes by a corresponding amount, and the focus position on the position detector element 69 changes.

The primary diffraction angle θ versus changes in the wavelength λ when the repetitive pitch P of the diffraction grating 67 is set at 500 nm and 1000 nm is shown respectively in FIGS. 5 and 6. The change in the diffraction angle θ for each one nanometer of wavelength is respectively 0.91 degrees per nanometer and 0.08 degrees per nanometer when the repetitive pitch P was set at 500 nm and 1000 nm.

When the focus distance of the condenser lens 68 is set as f, then the amount of change Δx of the condensing position on the light receiving surface of the position detector element 69, versus the change Δx of this kind of diffraction angle, can be expressed by the following formula:

$$\Delta x = f \cdot \Delta \theta \quad (1)$$

Thus, when the repetitive pitch P is 500 nm, and the wavelength λ changes by 1 nm, setting the focal length f of condenser lens 68 to 20 mm can yield an amount of change Δx =66 μm/nm per a 0.003 radian change in the diffraction angle θ by using Formula 1. As is clearly evident, a sufficient degree of detection sensitive allows the change in wavelength λ of the exposure laser beam LR to be detected.

The diffraction grating 67 is made of a material such as quartz or low heat expansion glass in order to prevent a drop in precision due to heat expansion. The reflected light from the diffraction grating 67 may also be used as diffraction light and in such a case, a metal material with a high reflection rate should comprise the diffraction grating.

In the temperature compensator 65, a comparator circuit 70 compares the wavelength detection results of the position detector element 69 with the reference voltage REF. These comparison results drive a Peltier element 71 to heat and cool the semiconductor laser 52. The Peltier element has a response time of several milliseconds so that not only can gentle changes in wavelength from temperature fluctuations be prevented, but also changes in wavelength occurring for instance, when a base disk 7 driven under fixed angular speed conditions and with exposure intensity changing according to radial displacement of the light exposure position such as when making latent images on the optical disk for reproduction under fixed linear speed conditions, can be prevented.

A ¼ wave plate 75 (FIG. 1) however, emits the exposure laser beam LR as a circular polarized light by applying a phase differential to the exposure laser beam LR that permeated through the polarized beam splitter 63, and this configuration does not allow returning light from the exposure laser beam to permeate the beam splitter 63 and return to the semiconductor laser 52.

An XY shifter 76 is transparent parallel plate of a specific thickness. Fine adjustments can be made to the inclination with a tilt adjuster not shown in the drawing. Fine adjustments to the tilt move the optical axis of the exposure laser beam LR in parallel so that the exposure laser beam LR optical axis matches the optical axis of the (downstream) optical system. When a parallel shifter mechanism is installed on the laser light source 51 side, this XY shifter 76 can be omitted so that the overall dimensions can be made compact by a corresponding amount.

The optical system 44 beams the exposure laser beam LR emitted from this XY shifter 76 onto the dichroic mirror 47 by way of the chromatic aberration correction optical system 78 and the beam expander 79.

This aberration correction optical system 78 comprises an optical system to apply a chromatic differential to the exposure laser beam LR to cancel out chromatic aberrations by way of the objective lens 48. In this embodiment, a set of two lenses 78A and 78B are positioned a specified distance apart and comprised of a convex lens of crown glass having a positive low refraction index and a concave lens of flint glass having a negative high refraction rate laminated together. The aberration correction optical system 78 may also be comprised of just one lens.

In the optical system 44 for the exposure laser beam, except for the beam expander 79, the aberration correction optical system 78 is installed at a position nearest to the objective lens 48 so as not to allow astigmatisms or aberrations occurring due to operation errors from other optical elements, from effecting correction of the chromatic aberrations. By further installing the optical system 44 just prior to the beam expander 79, on the optical path of the exposure laser beam LR constituted of parallel light rays, adjustments made to the beam expander 79 explained later on, will have no effect on the chromatic aberration corrections.

The beam expander 79 includes a concave lens 79A and a convex lens 79B to expand the beam diameter of the exposure laser beam LR. The beam expander 79 includes a concave lens 79A on the input beam side and the respective focal distances f3 and f4 of the concave lens 79A and convex lens 79B are utilized to indicate the expansion rate M as f4/f3. The distance between lenses is shorter yet can yield an identical expansion rate compared to the case of a convex lens combination in FIG. 11. Also, compared to the case in FIG. 11 using a convex lens combination, there is need to set f2 +f1 as the space between lenses, f1 and f2 are the respective focal distances of the convex lenses 26 and 27, respectively, and in this embodiment is f4-f3.

The beam expander 79 is further configured to make fine adjustments to the position of the convex lens 79B along the optical axis of the exposure laser beam LR as shown by the arrow C in FIG. 1. The exposure laser beam LR can thus be emitted with high precision as parallel light rays.

Thus, in the exposure laser beam optical system 44, the exposure laser beam LR is beamed onto the dichroic mirror 47 and this exposure laser beam LR is then focused onto the base disk 7 by the objective lens 48. Further, the returning light LRB consequently obtained, travels the reverse path of the optical system and enters the polarized beam splitter 63, and the returning light LRB is isolated from the exposure laser beam LR by this polarized beam splitter 63 by means of a phase differential applied from the ¼ wave plate 75.

A ¼ wave plate 81 converts the returning light LRB isolated by the polarized beam splitter 63 into a circular polarized light and next, the polarized beam splitter 82 separates this returning light LRB into two light rays by means of the reflected light and permeated light of returning light LRB.

A lens 83 focuses the returning light LRB on the reflected light side of the polarized beam splitter 82, and next, the mirrors 84, 85 bend the optical path of this returning light LRB to guide it into the imaging device 86. The imaging device 86 captures an image of this returning light so that an image of the beam shape on the base disk 7 is output as the imaging results. In this way, therefore in the optical system 44, image results from capturing an image the beam shape on the base disk can be monitored.

The ¼ wave plate 88 however, applies a phase differential to the returning light that permeated the polarized beam splitter 82. The returning light is thus focused on the optical receiving element 90 and the reflected light that occurs, permeating the polarized beam splitter 82 does not return to the objective lens 48 side.

The lens 89 focuses the returning light beamed from this ¼ wave plate 88, and next the optical receiving element 90 receives the returning light focused by the lens 89 and outputs the detection results. In this way, therefore in the optical system 44, these detection results can be utilized to make fine adjustments to the distance between the lenses per the beam expander 89 and to make fine adjustments to the focus.

Figure 7:
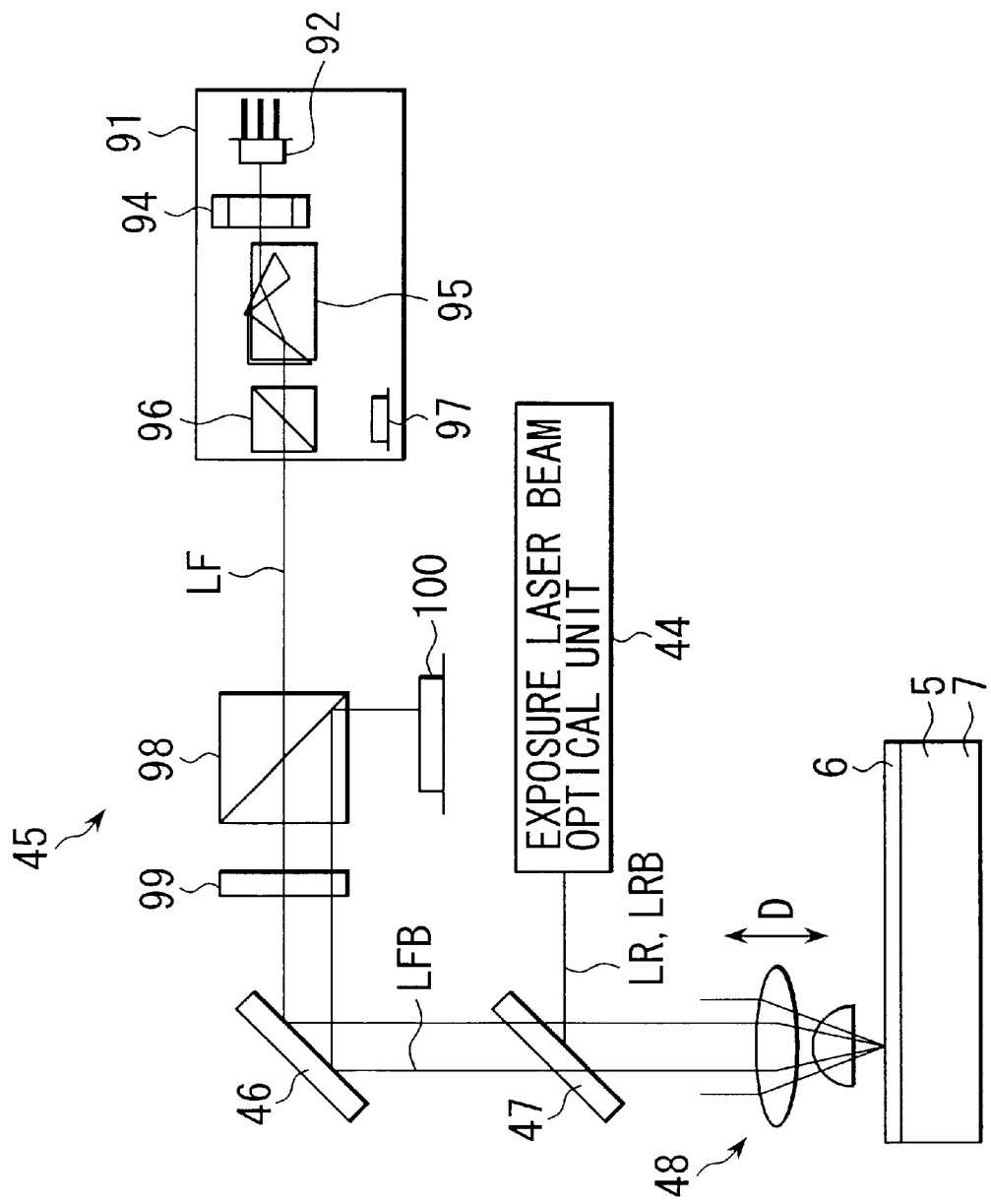
FIG. 7 is a diagrammatic sketch showing the focus control optical system.
Figure 9A:
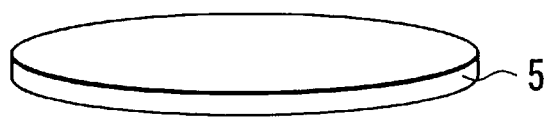
FIGS. 9A to 9C are perspective views for describing the optical disk manufacturing process.
Figure 9B:
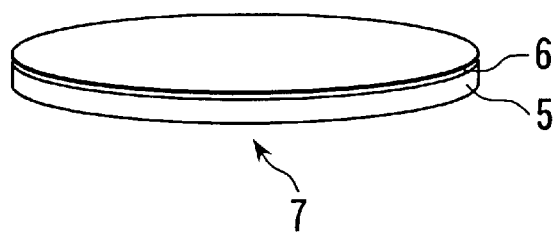
Figure 9C:
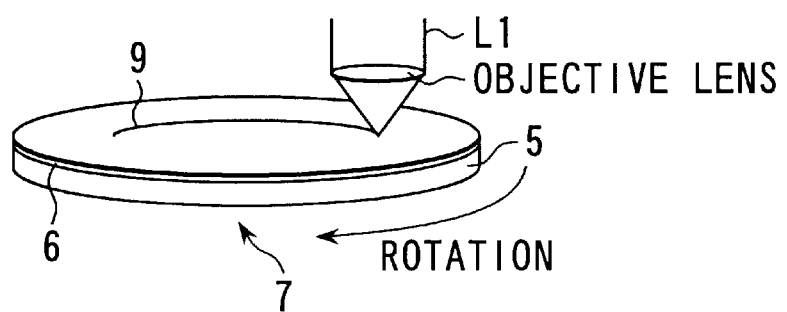
Figure 9D:
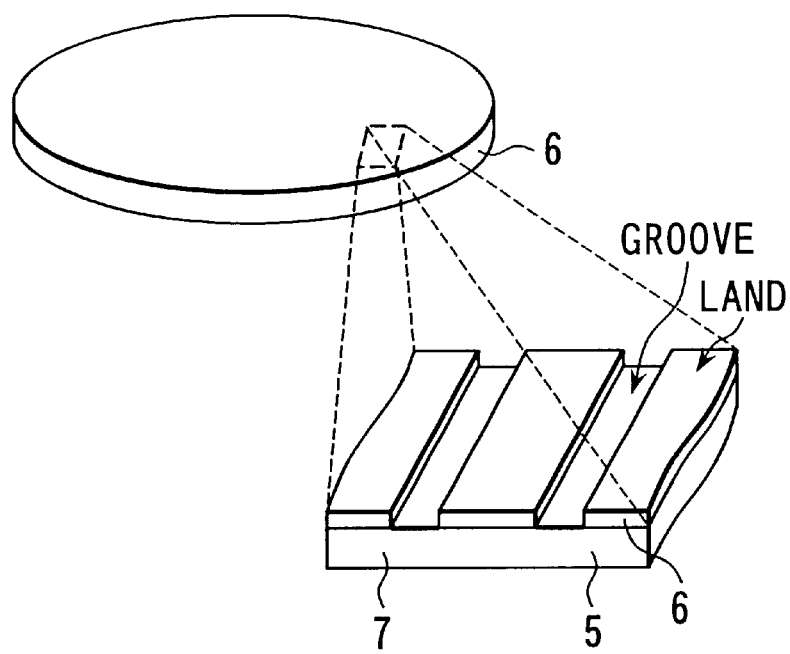
FIGS. 9D to 9F are perspective views for describing the continuation of the process of FIGS. 9A to 9C.
Figure 9E:
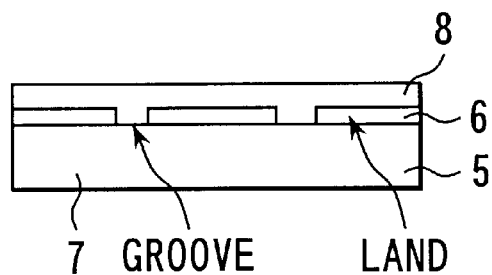
Figure 9F:
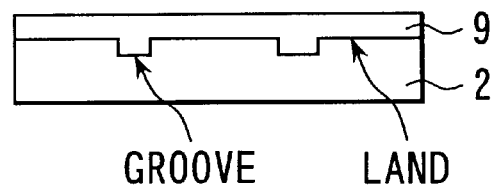
Figure 10:
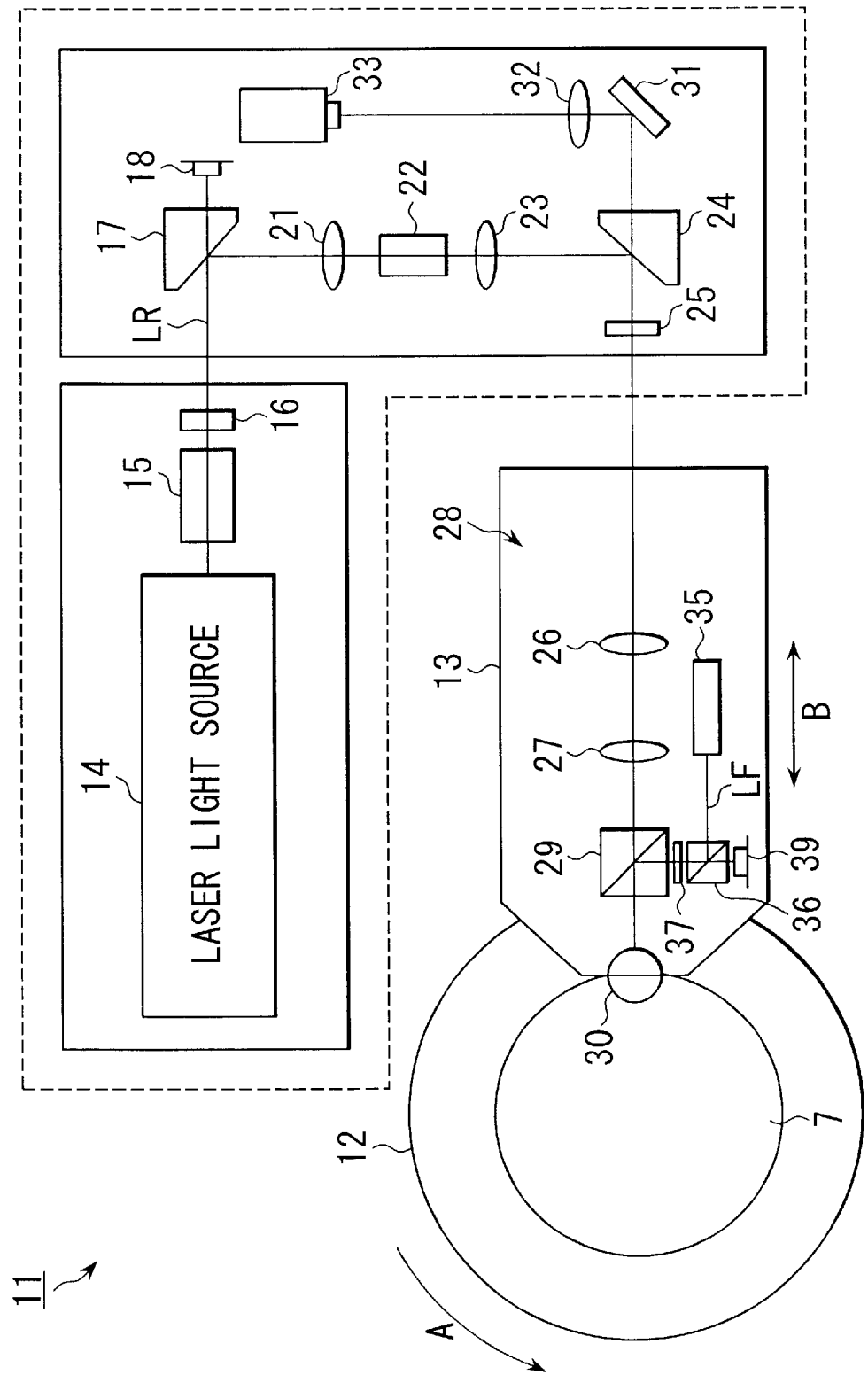
FIG. 10 is a flat view showing the light exposure device of the related art.

A diagrammatic sketch of the optical system 45 used for focus control is shown in FIG. 7. In this optical system 45 for focus control, a laser light source 91 emits a focus control laser beam LF. In other words, the laser light source 91 emits a laser beam LF on a wavelength different from the exposure laser beam LR, and a collimator lens 94 converts this laser beam LF into roughly parallel light rays and emits these light rays. Next, an anamorphic prism 95 rectifies the beam shape of the laser beam LF, and then the beam splitter 96 isolates the laser beam LF into two light rays.

An optical receiving element 97 receives the light of the laser beam LF reflected at the beam splitter 96 and outputs the detected light quantity results. The focus control optical system 45 configured in this way can monitor the light quantity of the laser beam LF emitted from the semiconductor laser 92 and regulate the light quantity of the laser beam LF to maintain a fixed light quantity.

In the focus control optical system 45, after the other light ray has permeated through the polarized beam splitter 98, the ¼ wave plate applies a phase differential and emits the light ray to a mirror 46. In the focus control optical system 45 configured in this way, the laser beam LF input to the objective lens 48 is input as an extremely small diameter beam to a point separate from the optical axis of the objective lens 48. This laser beam LF is further selected to have a wavelength and light quantity that will not expose the photoresist 6 formed on the base disk 7, and also selected with a wavelength that will be reflected away from the surface of the photoresist 6. In this way in the focus control optical system 45, the laser beam LF is beamed diagonally onto the surface of the photoresist 6 in a regular (specular) reflection. Further, the focus control optical system 45 is configured so the returning light LFB returns in the optical system after separating from the laser beam LF optical axis, and further configured so that the distance separating the optical axis of the laser beam LF varies according to the distance from the objective lens 48 to the surface of the photoresist 8.

In the focus control optical system 45, the returning light LFB returning in the optical system after a regular (specular) reflection on the surface of the photoresist 6 in this way, is applied with a phase differential by the ¼ wave plate 99, and thus reflected at the polarized beam splitter 98. The returning light LFB reflected at this polarized beam splitter 98 is received at the position detector element 100, and based on the detection results of the light receiving position obtained from this position detector element 100, the distance from the objective lens 48 to the surface of the photoresist 6 is detected. In the focus control optical system 45, based on these distance detection results, the objective lens 48 moves along the optical axis of the exposure laser beam LR as shown by the arrow D in FIG. 7, and the focusing of the exposure laser beam LR is thus controlled.

(2) Operation of the Embodiments

In the light exposure device 41 (FIG. 1 and FIG. 3) of the above structure, a laser light source was comprised of a semiconductor laser 52, and a base disk 7 exposed to light by an exposure laser beam LR beamed from this semiconductor laser 52. Utilizing the semiconductor laser 52 allows the laser light source to be compact compared to when using a gas laser, and the overall shape can be reduced by a corresponding amount.

Utilizing the semiconductor laser 52 in the light exposure device 41 further allows directly driving the semiconductor laser 52 and modulating the exposure laser beam LR. The optical element used for modulation can therefore be omitted and the design of the optical system can be simplified. Accordingly, the time required for making adjustments can be shortened, and the optical path shortened and a drop in light exposure precision due to air turbulence prevented.

Also, the exposure laser beam LR is separated into two light rays by the polarized beam splitter 56 and the light quantity detected by the light receiving element 59. The drive signal of the semiconductor laser 52 corrected based on these light quantity detection results by an automatic light quantity control device, and the optical elements for regulating the light quantity can thus be reduced. The time required for making adjustments can therefore be shortened by a corresponding amount, the optical path shortened and a drop in light exposure precision due to air turbulence prevented.

The amount of heat emitted can also be reduced compared to the case when a gas laser is utilized so that in temperature control achieved by the circulation of fluid, the quantity of circulating fluid can be reduced by an amount corresponding to reduction in heat emissions. A reduction in light exposure precision due to vibration from the circulation of fluids can also be prevented by a corresponding amount.

In other words, after the exposure laser beam LR (FIG. 3) emitted from the semiconductor laser beam 52 is converted to parallel light rays by the collimator lens 53, the beam shape is rectified by an anamorphic prism 57, and the light next split into two light rays by the polarized beam splitter 56 according to a phase differential applied by the ¼ wave plate 55. One of the above mentioned light rays of the exposure laser beam LR is used in automatic regulation of the light quantity, and the other ray is beamed to the beam splitter 63 (FIG. 1) by way of the ¼ wave plate 60.

The optical system in the light exposure device 41, from the semiconductor laser 52 to the ¼ wave plate 60 comprises devices relating to automatic light control, and drive circuits for the semiconductor laser 52 mounted on one optical circuit board. Therefore, after separate adjustments of these optical systems, the entire optical system is positioned and assembled in the light exposure device 41. The task of assembly is therefore simplified in the light exposure device 41 and also maintenance tasks such as replacement of the semiconductor laser 52 can also be simplified.

The exposure laser beam LR emitted from the laser light source 51 is separated into two light rays by the polarized beam splitter 63. Of these two light rays, one light ray is beamed onto the wavelength detector 64 and the wavelength of the exposure laser beam LR detected. These detection results are then used by the temperature compensator 65 to control the temperature of the semiconductor laser 52.

In other words, in the wavelength detector 64 (FIG. 4) the exposure laser beam LR is beamed onto the diffraction grating 67, here a diffraction light is generated by the diffraction angle θ according to input wavelength λ. Light is also focused on the position detector element 69 by the lens 68, and the wavelength λ detected, by detecting the focus position according to the diffraction angle θ here. The semiconductor laser 52 is heated and cooled by driving the Peltier element 71 so that the wavelength λ is a fixed wavelength. In this way, fluctuations in the wavelength due to changes in the high precision can be prevented even when using the semiconductor laser 52 as the laser light source.

In particular, by utilizing a high response speed in temperature control utilizing items such as a Peltier element 71, cooling can be performed to compensate for temperature changes to prevent changes in the wavelength due to temperature fluctuations, even when the temperature of the semiconductor laser 52 fluctuates due to variations in light the quantity.

After fluctuations in wavelength have been prevented in this way, the light from the exposure laser beam LR that permeated the polarized beam splitter 63 is compensated for optical axis deviations by the XY shifter 76 and then the aberration correction optical system 78 applies compensations by means of the objective lens 48 for chromatic aberrations.

In the light exposure device 41, the exposure laser beam LR can be focused near the diffraction limit, even when using the semiconductor laser to focus an exposure laser beam LR having a widening wavelength. A fine beam spot can therefore be formed by a corresponding amount and improved light exposure precision can be achieved.

In the light exposure device 41, by installing the aberration correction optical system 78 (except for the beam expander 79) at a position closest to the objective lens 48, astigmatisms or aberrations occurring due to operation errors from other optical elements can be prevented from effecting the correction of chromatic aberrations, and the light exposure precision can thus be improved.

Also, by installing the aberration correction optical system 78 at a position just prior to the beam expander 79, and further, by installing on the optical path of the exposure laser beam LR constituted of parallel light rays, adjustments of the beam expander 79 can also be made to have no effect on chromatic aberration corrections. The adjustment task can be correspondingly simplified, and a reduction in light exposure precision can be prevented.

The beam diameter of the exposure laser beam LR now compensated for chromatic aberrations by the aberration correction optical system 78, is enlarged to a specified beam diameter by the beam expander 79 and the optical path then bent by the dichroic mirror 47 and the beam focused on the base disk 7 by the objective lens 48.

When the exposure laser beam LR is focused on the base disk 7 in this way, a reflected light is obtained from the base disk 7. The reflected light travels as returning light, the reverse of the optical path of exposure laser beam LR and is separated into two light beams by the polarized beam splitter 63. One of these two light beams from the now separated exposure laser beam LR is supplied to the imaging device 86, an image captured and used to monitor the shape of the beam on the base disk 7, further the quantity of returning light is received by the optical receiving element 90 is detected.

In the light exposure device 41, the received light results from this returning light can be utilized to simplify the task of making adjustments, in fine adjustment of the distance between lenses for the beam expander 79, and utilized in fine adjustments of the focus.

A look at the optical path of the returning light in the light exposure device 41 in other words shows, that by applying a phase differential to the returning light LR and exposure laser beam LR with the ¼ wave plate 76, and by separating the returning light from the exposure laser beam LR with the polarized beam splitter 63, the light of the two separated light rays can be obtained with virtually no loss of returning light from the base disk 7.

Therefore, besides just utilizing the returning light for observation of the beam shape on the base disk 7 as in the light exposure device of the related art, the quantity of returning light can also be detected and adjustments made.

In other words, when comprised of an objective lens 48 for the infinite compensation type optical system, such as in the light exposure device 41, when a slight focusing or divergence of the parallel rays constituting the exposure laser beam LR beamed on the objective lens 48 occurs, the beam shape may deteriorate due to spherical aberrations occurring on the base disk 7.

However, by means of an objective lens 48 that has its own spherical aberration, in this embodiment, by making fine adjustments of the distance between lenses per the beam expander 79, the beam spot diameter can be reduced to a minimum, and the beam spot diameter can further be reduced to a minimum by adjusting with the aberration correction optical system 78.

In this way in the light exposure device 41, adjustments can easily and reliably implemented by setting a base disk for standard reproduction and irradiating it with the exposure beam LR, and then by adjusting the space between the lenses per the beam expander 79 so that the amplitude value for the light detection quantity obtained with the optical receiving element 90 reaches the largest value, or by adjusting the space between the lenses per the aberration correction optical system 78. Incidentally, if these methods are not used, and the adjustments are made by making visual judgments from the imaging results from the imaging device 86, then a great deal of time is required to make the adjustment. Further, achieving a high degree of precision in the adjustment will be difficult. Also, when an aberration correction optical system 78 is not provided, and the adjustment is attempted based on the imaging results, fluctuations in the wavelength during the adjustment will render the adjustment operation a wasted effort.

By using an optical system of this type that separates and processes the returning light, focus control methods such as the astigmatism method or knife-edge method used in optical disk devices of the related art can be utilized to control the focus, instead of using an optical receive element to receive the returning light. In particular in the case of equipment to emit a focus control laser beam as in the light exposure device 41, chromatic aberrations may sometimes occur with the exposure laser beam LR and the focus control laser beam due to the objective lens 48. When these kinds of chromatic aberrations cannot be ignored, these focus control methods can be applied as needed to achieve reliable focus control. In such cases, the exposure laser beam LR must constantly be irradiated onto the base disk 7 and so can be applied for instance, when forming latent images with grooves instead of pit arrays. Such focus control methods can also be used in combination with irradiation by other focus control laser beams.

More specifically, in the focus control optical system 45 (FIG. 7), after the laser beam LF emitted from the semiconductor laser 92 is converted into parallel rays by the collimator lens 94, the beam shape is then rectified by the anamorphic prism 95. Next, the laser beam LF is separated into two light rays by the polarized beam splitter 96. Of these two light rays, one light ray is subjected to automatic light quantity control according to the light quantity detector results. The optical path of this focus control laser beam LF is bent by the mirror 47 by way of the polarized beam splitter 98 and ¼ wave plate 99, combined with the exposure laser beam LR by the dichroic mirror and beamed onto the base disk 7 by the objective lens 48.

In the focus control optical system 45, the light reflecting from this base disk 7 travels the reverse of the optical path of the laser beam LF, is separated from the laser beam LF at the polarized beam splitter 98, and the light receiving position is detected by the position detector element 100. The distance from the objective lens 48 to the base disk 7 is detected in this way, and the objective lens 48 moved to achieve focus control so the distance becomes a fixed value.

In this way in the light exposure device 41 (FIG. 1) for exposing the base disk 7 to light, the optical system 44 for the exposure laser beam and, the optical system 45 for focus control are respectively held in plate-shaped members constituted by a holding member 44 and a holding member 45 and installed for easy replacement, in the optical drive table 42. Here, by using a semiconductor laser 52 in the laser light source, and storing the optical system 44 and the focus control optical system 45 in this way in the optical drive table 42, the movement of this optical drive table 42 can form exposure laser beam (LR) scanning tracks in a spiral shape on the base disk 7. The overall structure can therefore be simplified by a corresponding amount.

Also, besides storing the optical system from the laser light source to the objective lens 48 in the optical drive table 42 in this way, an optical system of the light exposure device 41 is stored within a sealed space so that air cannot flow inside. This sealed space prevents turbulence from the inflow of outside air, so that the exposure precision is improved by a corresponding amount.

Also, by circulating fluid in the bottom of this optical drive table 42, the internal temperature of the semiconductor laser 52 can be maintained within plus or minus one degree, therefore preventing variations in wavelength due to temperature fluctuations.

More specifically, even though compensation for changes in wavelength is implemented by temperature control with the Peltier element to offset the heat generated by the semiconductor laser 52 during laser emission, temperature fluctuations in the device itself due to other factors must also be taken into account.

In particular, in the case of DVD or compact discs where the pit and space lengths are a one-to-one match and temperature variations are largely fixed during laser emission, once the light exposure has commenced, a fixed temperature is maintained in the semiconductor laser 52 itself. Therefore, in some cases, change in wavelength of the exposure laser LR can be prevented just by controlling the atmospheric temperature.

Light exposure devices require that changes in wavelength be maintained at about plus or minus 0.6 nm. In semiconductor lasers, if temperature fluctuations can be controlled to less than plus or minus 2 degrees by varying the wavelength about plus or minus 5 nm versus package temperature changes of plus or minus 20 degrees, then this goal can be achieved. However, since some variations in temperature dependence exist among semiconductor lasers, if the wavelength of future exposure laser beam LR becomes even shorter, then the margin of allowable wavelength variations will become smaller, requiring temperature control be used to accommodate this smaller margin.

By a temperature control that surpasses the current performance of the related art that controls temperature fluctuations to within plus or minus 2 degrees, this embodiment can control the temperature to within plus or minus one degree so that, changes in wavelength due to variations in the ambient temperature can be sufficiently prevented, and a reduction in exposure precision due to changes in wavelength can also be prevented.

In a laser light source comprised in this way by a semiconductor laser 52, in this embodiment, by providing plate-shaped members constituted by the replaceable holding members 44A and 45A, installed on the optical drive table 42 along with the related electronic components for the exposure laser beam optical system 44 and the focus control optical system 45, even if a problem occurs in the exposure laser beam or focus control optical systems, these holding members 44A and 44B can each be replaced to resolve the problem. Also the task of assembly can be simplified, by adjusting with these holding members 44A and 44B.

In actual use, with the laser light source comprised of a semiconductor laser, these holding members 44A and 44B can be mounted with the optical systems and related electronic components while constituting the same size as a B4 sheet of paper, and the overall size of the equipment can be made more compact by a corresponding amount.

Just as in the light exposure device of the related art, when the optical system is split up and a portion of the optical system is installed in the optical drive table, problems such as deviation of the focus point position or blurring of the exposure laser beam LR at the input aperture of the objective lens may occur from movement of the optical drive table, from tiny divergence, convergence or tilting of the optical axis. However, by installing the entire optical system on the optical drive table, such problems can all be eliminated. The extent of freedom allowed in the design is also improved.

Also, in optical systems having the respective holding members 44A, 44B, the entire optical system can be easily replaced according to the light exposure pattern to be formed on the base disk 7, and the convenience and usability of the light exposure device 41 can thus be improved by a corresponding amount. When changing the optical system according to the type of exposure pattern is required, the latent image may sometimes be formed of grooves rather than pit arrays, or light exposure for the latent image may be performed by a combination of these methods, and in some cases the groove may be made to form a snaking path by installing a polarized optical element to vary the direction of the exposure laser beam LR. The light exposure device 41 is capable of performing light exposure on base disks compatible with each type of optical disk format.

In the manufacturing site of the related art, the adjustment needed for changing the optical system in the light exposure device requires time and also has poor reproducibility so that separate light exposure devices must be prepared respectively for optical disk with pit arrays, optical disks with grooves, and optical disk with combinations of pits and grooves. The light exposure device 41 in contrast, can be used with good efficiency as a light exposure device and the productivity is also improved.

Even if the exposure laser beam optical system is changed, no change of the focus control optical system is needed in this embodiment, and the exposure laser beam optical system and focus control optical system are stored separately and capable of being efficiently used.

(3) Effects of the Embodiments

In the structure of the above described embodiment therefore, by compensating the chromatic aberration of the objective lens by means of an aberration correction optical system, a laser light source comprised of a semiconductor laser can expose the base disk to light with high precision.

Further in the above embodiment, by installing the beam expander on the semiconductor laser side, when the objective lens comprises an infinite compensation type optical system, the effect of aberrations due to other optical systems can be avoided and chromatic aberrations can be compensated.

Also in the above embodiment, by controlling temperature changes in the vicinity of the laser light source to within plus or minus one degree by means of a temperature regulator mechanism for circulation of fluid, a laser light source using a semiconductor laser to emit an exposure laser beam within a wavelength of 500 nm can expose the base disk to light with high precision.

Further in the above embodiment, by regulating the temperature of the semiconductor laser to make the wavelength of the exposure laser beam a fixed wavelength, changes in wavelength due to temperature fluctuations can be prevented and therefore a laser light source comprised by a semiconductor laser can expose the base disk to light with high precision.

Yet further in the above embodiment, by diffracting the exposure laser beam, and detecting the exposure laser beam by detecting the diffraction angle, changes in the wavelength can be detected with high precision and changes in the wavelength thus sufficiently prevented.

Also in the above embodiment, by detecting the focus position of the diffracted light focused by the focusing means, the desired detection sensitivity can be obtained by making settings with the focusing means.

Further in the above embodiment, by installing the optical system from the semiconductor laser to the objective lens in a sealed space, turbulence due to the intrusion of outside air can be prevented and the precision of the light exposure improved by a corresponding amount.

Also in the above embodiment, by containing the optical system, from the emitting of the exposure laser beam of the semiconductor laser to the beaming to the objective lens in one optical system holding member, the efficiency for performing maintenance tasks can be improved, and the task of assembly can be simplified.

Further in the embodiment at this time, by containing the focus control optical system in one focus control holding member and, by containing the optical system of the objective lens, exposure laser beam holding member shiftable with respect to the target for exposure, in one unit along with the focus control holding member, the task of assembly can be simplified and the maintainability also improved.

Also in the above embodiment, by containing the automatic light quantity regulator and optical system in one replaceable holding member, the adjustment of these mechanisms can be simplified and, and the maintainability also improved.

Still further in the above embodiment, by detecting the light quantity along with capturing an image of the returning light separated by the polarized beam splitter constituting the light isolator means, light exposure can be facilitated while monitoring the current status, and the task of adjusting the optical system is greatly simplified.

(4) Other Embodiments

The above-described embodiment described an objective lens comprising an infinite compensation optical system however this invention is not limited to this example, and is also widely applicable even to an objective lens comprising a finite compensation optical system. In such a case, a chromatic aberration compensation optical system is installed on the laser source side from the lens for input of divergent light from the exposure laser beam LR to the objective lens, and chromatic aberrations compensated avoiding effects from aberrations in other optical systems.

The above related embodiment described the objective lens and beam expander as comprising separate units however this invention is not limited to such an example, and the objective lens and the beam expander may comprise one unit.

The above related embodiment also described the objective lens and the chromatic aberration compensation optical system as comprising separate units, however this invention is not limited to such an example, and the objective lens and the chromatic aberration compensation optical system may comprise one unit.

The above related embodiment further described the light exposure of the base disk by means of an exposure laser beam of a wavelength of approximately 400 nm, however this invention is not limited to such an example, and is also applicable to light exposure of the base disk by means of an exposure laser beam of a wavelength of approximately 500 nm, and can obtain the same effects as in the above described embodiment.

The above related embodiment also described the light exposure of a base disk, however this invention is not limited to such an example, and is also widely applicable to light exposure card type information record medium having an information recording surface the same an optical disk, as per the manufacture of stampers.

In the invention as described above, a laser light source comprised of a semiconductor laser can perform light exposure of base disks with high precision by controlling the temperature of the semiconductor laser by compensating for chromatic aberrations or compensating for fluctuations in the wavelength.

What is claimed is:

1. A manufacturing device for a base disk of an optical recording medium to make a latent image comprising tiny irregularities on a specified exposure target by scanning the target with an exposure laser beam, comprising:

a semiconductor laser configured to emit said exposure laser beam;

an objective lens configured to focus and emit said exposure laser beam onto said specified exposure target; and a chromatic aberration compensation optical system configured to compensate for chromatic aberrations in said objective lens for at least said exposure laser beam.

2. A manufacturing device for a base disk of an optical recording medium as claimed in claim 1 with said objective lens as an infinite compensation type optical system, further comprising:

a beam expander configured to widen the diameter of said exposure laser beam and to emit said exposure laser beam, wherein said chromatic aberration compensation optical system is nearer to said semiconductor laser than said beam expander.

3. A manufacturing device for a base disk of an optical recording medium as claimed in claim 1 with said objective lens as a finite compensation type optical system, further comprising:

a specific lens converting said exposure laser beam into divergent light and emitting said exposure laser beam, wherein said chromatic aberration compensation optical system is installed nearer to said semiconductor laser than said specific lens.

* * * * *

UNITED STATES PATENT AND TRADEMARK OFFICE
CERTIFICATE OF CORRECTION

PATENT NO. : 6,754,161 B1  
DATED : June 22, 2004  
INVENTOR(S) : Shin Masuhara et al.

It is certified that error appears in the above-identified patent and that said Letters Patent is hereby corrected as shown below:

Column 5,
Line 35, change "oh" to -- on --.

Signed and Sealed this

Second Day of November, 2004

JON W. DUDAS
*Director of the United States Patent and Trademark Office*